June 17, 1958

A. H. KERSEY ET AL 2,839,033

POWER TRANSMISSION MECHANISMS FOR
HYDRAULICALLY PROPELLED VEHICLES

Filed Nov. 14, 1955

Inventors
A. H. Kersey
J. P. Creighton
By Hasenck Downing Hubbell
Attys.

Inventors
A. H. Kersey
J. P. Creighton
By Mason Downing Seebold
Attys.

United States Patent Office 2,839,033
Patented June 17, 1958

2,839,033

POWER TRANSMISSION MECHANISMS FOR HYDRAULICALLY PROPELLED VEHICLES

Albert H. Kersey and John P. Creighton, Castle Bromwich, near Birmingham, England, assignors to Ford Motor Company Limited, London, England Application November 14, 1955, Serial No. 546,733

Claims priority, application Great Britain November 19, 1954

2 Claims. (Cl. 121—182)

It is known to provide an arrangement of hydraulic transmission means to self-propelled vehicles comprising a variable and reversible delivery pump supplying fluid under pressure to a number of radiating cylinders in hydraulic propelling motors which are caused to rotate about the supporting shaft axis so that power can be provided to rotate and drive the wheels of the vehicle.

Usually such an arangement referred to incorporates the feature that the hydraulic propelling motors are located within and form part of the drive wheels of the vehicle and are rotatably driven by the reaction forces of the fluid pressure indirectly imposed upon a fixed and stationary eccentric cam, the valve mechanism for flow control to and from the cylinders being naturally located close to the motors at their remote position within the wheels of the vehicle and so arranged that the flow transfer member of such valve mechanism is stationary and contacts a valve facing which is part of, and therefore rotates with, the motor cylinder assembly.

The usual arrangement referred to has in common with other similar arrangements the several disadvantages of external fluid feed and return pipes of considerable length and complexity, heavy wheel or driving assemblies and a necessarily cumbersome assembly of components and units which are uneconomical to produce in large quantities.

An object of the present invention is to provide a self-contained transmission of compact proportions able to provide, as by known arrangements, infinitely variable speed control in forward or reverse directions of travel, braking of the vehicle by controlled diminution of fluid flow to the hydraulic propelling motor cylinders to bring the vehicle to rest or reduce its travelling speed without interrupting the drive from the main power unit.

The transmission consists of a vehicle transmission means in which the output drive shaft of a pair of output drive shafts is driven by a propelling unit in the form of an hydraulic multi-cylinder motors, the two hydraulic multi-cylinder motors being closely positioned in relationship to each other and a common control valve mechanism is interconnected with the cylinders of each hydraulic propelling motor for directional control of fluid flow thereto.

If there are more than one pair of output drive shafts, similar arrangements may be provided for each pair.

Preferably the common control valve mechanism for effecting directional control of fluid flow comprises a stationary flow distributing member provided with a pair of valve facings to which the fluid is directed and upon each of which facings a rotating flow transfer member or valve is closely and slidably in contact to achieve without appreciable leakage the transfer of pressurised fluid to and from the stationary cylinders of the respective hydraulic propelling motor.

Conveniently the cylinders of each hydraulic propelling motor are stationary and fluid pressure causes to rotate an eccentric cam attached to or integral with each motor output drive shaft.

Conveniently, also each motor output drive shaft drives the respective flow transfer member of the common control valve mechanism.

Thus a conventional power unit drives a known type of variable and reversible delivery pump of relatively large capacity which supplies fluid under pressure to two or more stationary hydraulic propelling motors for actuation of the output drive shaft of each motor thereby transmitting power and motion directly or through supplementary gearing to the wheels of tracks of self-propelled vehicles. The hydraulic propelling motors comprise a multiplicity of stationary cylinders radiating from the centre of each motor and within each cylinder a piston or ram receives fluid under pressure for actuation of a piston connecting rod contacting with and forcing to rotate one or more eccentric cams to effect rotation of the hydraulic motor output drive shaft. Fluid flow is delivered from the pump through a relatively short piping or conduit system to a stationary fluid flow distributing member common to and interconnected with each pair or adjacent hydraulic propelling motors, these motors so disposed to be sufficiently close to each other as to permit a compact arrangement of motors and fluid flow distributing members to be achieved within or forming part of a transmission casing. The return stroke of each piston forces fluid under low pressure back to the pump through the fluid flow distributing member and other pipe conduits, directional flow to and from each motor cylinder being achieved by and through a rotating flow transfer member or valve contacting with a facing on the fluid flow distributing member and driven by the motor output drive shaft, hydraulic balancing of the flow transfer member for any operating fluid pressure being provided by a system of porting within the flow transfer member to allow fluid operating pressure to act on the back or non-operating face of the transfer member as a reaction from the end of the motor output drive shaft, reversal of fluid flow from the pump to effect an opposite direction of travel causing an automatic control to operate within this porting system to maintain at all times hydraulic balance of the flow transfer member for any operational fluid pressure.

A practical and preferred embodiment of the invention will be described with reference to the accompanying drawings and which is designed to facilitate production and reduce size, weight and cost of the hydraulic transmission means.

Figure 1:
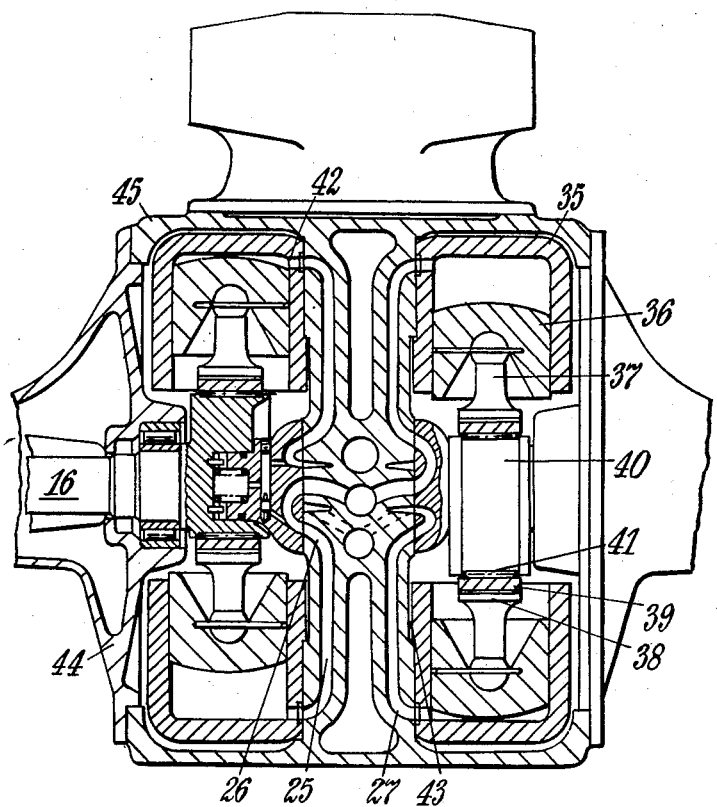
Figure 1 is a cross section through the transmission of a wheeled vehicle.
Figures 2, 3:
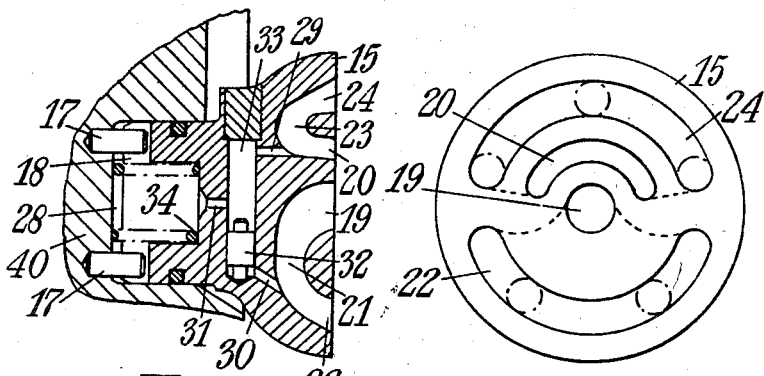
Figure 2 is a longitudinal section through the fluid flow transfer member (or plate valve as hereinafter termed and described) of the flow valve mechanism.
Figure 3 is a view of the face of the plate valve.
Figure 4:
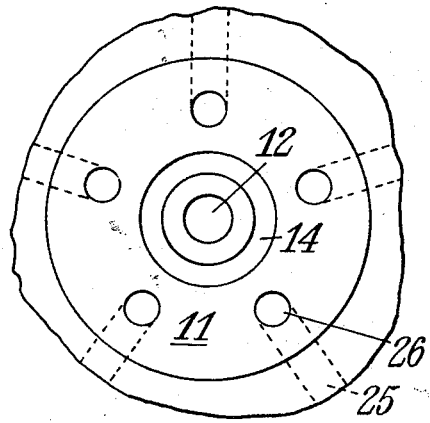
Figure 4 is a view of the ports in the fluid flow distributing member (or valve plate as hereinafter termed and described) of the fluid flow valve mechanism.
Figure 5:
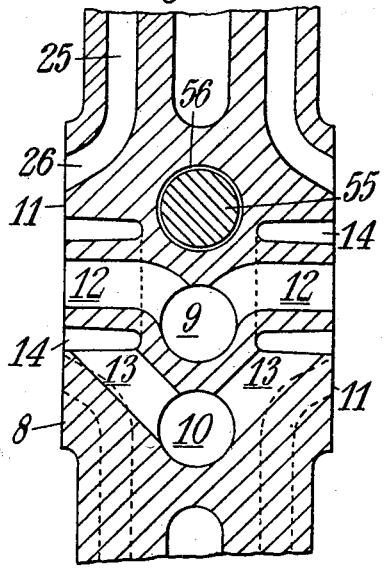
Figure 5 is a cross section through the valve plate.

Referring to Figures 1, 4 and 5, two pipes (not shown) are connected to the ports of the pump and at their other ends to two passages 9, 10 in a valve plate 8 which diverge to a valve face 11 on each side of the valve plate 8 by means of each passage being divided at or near the centre of the valve plate 8 into cross ports 12, 13. The cross port 12 at the centre of the valve plate extends directly to each valve face 11 whilst the divided ports 13 are connected to an annular space 14 in each valve face concentric with but separate from the exit of the centre cross ports 12.

Referring to Figures 1 to 5 inclusive, adjacent and in face contact with the valve faces 11 are plate valves 15 each freely supported in and positively driven by a motor output drive shaft 16 the drive being obtained through pins 17 fixed in each motor output shaft and locating in slots 18 in the back of each plate valve 15. The centre cross port 12 in the valve plate 8 connects directly with the centre opening 19 in each plate valve 15 whilst annular space 14 in the valve face of the valve plate connects with the inner slot 20 in each plate valve. The centre opening 19 in the plate valve is connected through an integral passage 21 to one outer slot 22 and the inner slot 20 is connected through another integral passage 23 to the other outer slot 24.

Within the valve plate 8 are passages 25 which connect ports 26 in the valve facings 11 with outer ports 27 located near the outer diameter of the valve plate. The outer slots 22, 24 in the plate valve 15 successively pass each of the ports 26 in the valve facing as the plate valve rotates each slot encompassing a minimum number of two ports 26 and a maximum number of three such ports.

To allow each plate valve 15 to be hydraulically balanced passages 21, 23 in the plate valve 15 are connected to the space 28 at the back of the valve through either of two passages 29, 30, and thence through a cross-bored hole 33 hydraulically sealed by a conventional plug to a passage 31 at or near the centre of the plate valve, the flow being directed by a shuttle type valve 32 in the cross-bored holes 33 according to which of the two passages 29, 30 is subjected to greater pressure as determined for the desired direction of travel, thus the reaction of fluid pressure on the end of each motor output drive shaft 16 provides hydraulic balancing at all times of the plate valve 15 whilst the vehicle is travelling in a forward or reverse direction. A light spring 34 located in the space 28 at the back of the plate valve is provided to enable the sealing of each plate valve 15 on its adjacent valve face 11 to be maintained when the motors are not working and the vehicle is stationary. A conventional compressible ring is located in an annular groove in the hub of the plate valve to prevent fluid other than that which is directionally controlled to pass to or from the space 28 at the back of the plate valve.

Referring to Figure 1 each motor consists of a multiplicity of cylinders 35 in this case five, preferably separate components rigidly attached to one side of the valve plate 8, each cylinder being provided with a piston 36 pivoted to a connecting rod 37 the inner end of which forms a slipper 38 for contact with a ring 39 freely and rotatably mounted on an eccentric cam 40 forming one end of the appropriate motor output drive shaft 16, needle roller bearings 41 being interposed between the ring 39 and the cam 40. Towards the outer or closed end of each cylinder 35 a cylinder port 42 connects with one of the outer ports 27 in valve plate 8 an hydraulic seal being obtained by a conventional compressible ring inserted into a counterbore or annular space provided at the junction of the two ports. A spigot type register land or ledge 43 is provided at each cylinder junction to valve plate to relieve the cylinder fixing means of the load imposed by the hydraulic forces within the cylinder. Each piston is provided with pressure sealing means of conventional design and the connection between each piston 36 and connecting rod 37 is as shown of the universally pivotal type loosely cross pin located for retention purposes although lightly loaded structures of the type referred to could be amply connected by the normal type of transverse piston or gudgeon pin there being no functional need for the universal pivotal type of connection whatever loading is imposed. The slipper 38 is faced with anti-friction material and in one version, not illustrated, of the proposed invention, fluid could be forced under pump pressure to the face of the slipper through a hole passing through the centre of the crown of each piston and thence through a hole on the longitudinal axis of each connecting rod to further lubricate the loaded face of the slipper 38.

Each motor output drive shaft 16 is supported in a housing 44 by conventional bearings and each housing 44 is rigidly attached by suitable means to the side of the transmission casing 45 concentrically in line with the centre-line of the motors and valve plate 8 the orifice on each side of the transmission casing 45 being of sufficient size to allow assembly of cylinders and other internal components to be facilitated.

Having described the preferred construction of the invention, it is now proposed to describe the flow of fluid to derive motion of the vehicle in one direction.

Fluid is forced by the main pump into passage 9 in the valve plate 8 the centre cross ports 12 and thence through the centre opening 19 in the plate valve 15 to the integral passage 21 connecting with the outer slot 22 thence into ports 26 at the valve facing and passages 25 and outer ports 27 in the valve plate 8 finally through the cylinder port 42 into the cylinder 35. Whilst fluid is being forced into a number of cylinders fluid is also being ejected under low pressure from other cylinders through the cylinder ports 42 outer ports 27 and passages 25 in the valve plate and ports 26 in the valve facing into the outer slot 24 the integral passage 23 connecting with the inner slot 20 of the plate valves 15 and thence to the annular spaces 14 the divided ports 13 and the offset passage 10 in the valve plate 8, the fluid finally passing to the supply side of pump.

The fluid being pumped under pressure to the cylinders 35 inwardly loads the pistons 36 thereby causing the connecting rods to load the eccentric cam 40 and so provide a turning moment on this cam about the centre of the motor output drive shafts 16. Wheels, sprockets or interposed supplementary gearing at the extreme outer or intermediate positions on these motor output drive shafts would therefore be rotated in the desired direction.

Reversal of direction of travel is achieved by reversing the flow of fluid within the circuit by means of manually operating the pump control so that fluid under high pressure is then directed to the previous low pressure side and the previous high pressure side becomes the low presure side.

A power take-off shaft 55 passes through a passage 56 in the valve plate 8 without affecting other passages, as shown in cross-section in Figure 6.

We claim:

1. In a vehicle hydraulic transmission comprising an hydraulic multi-cylinder motor, an output member driven thereby and a rotary flow-distribution valve for controlling the flow of fluid to and from the motor cylinders the improvement which consists of an axially floating flow-distribution member in the flow distribution valve having two axially oppositely disposed end faces and acting on one of said end faces as a seal between parts rotating in respect to each other and held in the sealing position by a fluid pressure on the opposite end face thereof which is at all times at a pressure equivalent to the pressure of the fluid being fed to the motor.

2. The improvement as claimed in claim 1 in which the flow distributing passages in the floating member to and from the motor cylinders start and finish on the sealing face and the floating member is provided with a shuttle valve, with passages extending from the flow distributing passage to the shuttle valve and with a passage extending from the shuttle valve to said opposite face.

References Cited in the file of this patent

UNITED STATES PATENTS

| | | |
|---|---|---|
| 89,471 | Dawson | Apr. 27, 1869 |
| 1,256,501 | Conradson | Feb. 12, 1918 |
| 1,266,606 | Manly | May 21, 1918 |
| 1,630,168 | Caut | May 27, 1927 |